(12) United States Patent
Smaldone et al.

(10) Patent No.: US 10,133,508 B1
(45) Date of Patent: Nov. 20, 2018

(54) METHOD AND SYSTEM FOR DATA PROTECTION BASED ON STORAGE STATUS

(71) Applicant: EMC Corporation, Hopkinton, MA (US)

(72) Inventors: Stephen D. Smaldone, Woodstock, CT (US); Jian Xing, Pleasanton, CA (US); Hyong Shim, Basking Ridge, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 14/304,623

(22) Filed: Jun. 13, 2014

(51) Int. Cl.
*G06F 3/06* (2006.01)

(52) U.S. Cl.
CPC ............ *G06F 3/065* (2013.01); *G06F 3/0614* (2013.01); *G06F 3/0653* (2013.01); *G06F 3/0683* (2013.01)

(58) Field of Classification Search
CPC .................... G06F 11/1456; G06F 11/2074
See application file for complete search history.

(56) References Cited

U.S. PATENT DOCUMENTS

| 7,509,468 | B1* | 3/2009 | Dalal | G06F 11/1458 |
| | | | | 711/152 |
| 7,707,461 | B2* | 4/2010 | Dougherty | G11B 19/048 |
| | | | | 714/47.2 |
| 8,260,750 | B1* | 9/2012 | Gugick | G06F 11/1451 |
| | | | | 707/645 |
| 2012/0089572 | A1* | 4/2012 | Raichstein | G06F 11/1461 |
| | | | | 707/645 |

\* cited by examiner

*Primary Examiner* — Adam M Queler
*Assistant Examiner* — Edmund H Kwong
(74) *Attorney, Agent, or Firm* — Womble Bond Dickinson (US) LLP

(57) ABSTRACT

A computer-implemented method for enhancing data protection is disclosed. The method starts with monitoring an operating status of a storage volume at a primary storage of a storage system, where the storage volume is allocated to one or more applications. The method continues with determining whether the operating status of the storage volume satisfies a predetermined condition and notifying a backup application to trigger a backup of the storage volume of the primary storage to a backup storage upon determining that the operating status of the storage volume satisfies the first predetermined condition.

20 Claims, 8 Drawing Sheets

METHOD AND SYSTEM FOR DATA PROTECTION BASED ON STORAGE STATUS

FIELD OF THE INVENTION

Embodiments of the present invention relate generally to data storage systems. More particularly, embodiments of the invention relate to data protection based on storage status.

BACKGROUND

Data storage is a critical component for computing. In a computing device, there is a storage area in the system to store data for access by the operating system and applications. In a distributed environment, additional data storage may be a separate device that the computing device has access to for regular operations. This kind of data storage is generally referred to as a primary storage, in contrast with a secondary storage, where computing devices also have access to but generally used for backing up. For data protection purposes, it is important to make regular copies of data from a primary storage to a secondary storage. While early backup strategies created complete (full) backups periodically, an alternate technique is to transfer only the incrementally modified data. By stitching together a newly modified data with a previous complete copy on the secondary storage, a new full backup can be reconstructed.

The data protection is generally performed using data protection scheduling, through which regular copies are made from the primary storage to the secondary storage. Traditionally data protection scheduling is based on fixed time intervals. However, without knowledge of the status of the primary storage, the backup may not occur at the best time. For example, one may schedule an hourly backup from a primary storage to a backup storage. The hour interval may not be sufficient when there are substantial data changes in the primary storage (e.g., when the primary storage concurrently runs multiple applications during prime time of a work day). In contrast, the hour interval may be too frequent when there aren't many changes in the primary storage (e.g., when the primary storage is in maintenance during weekend). It is a challenge to perform data protection efficiently.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
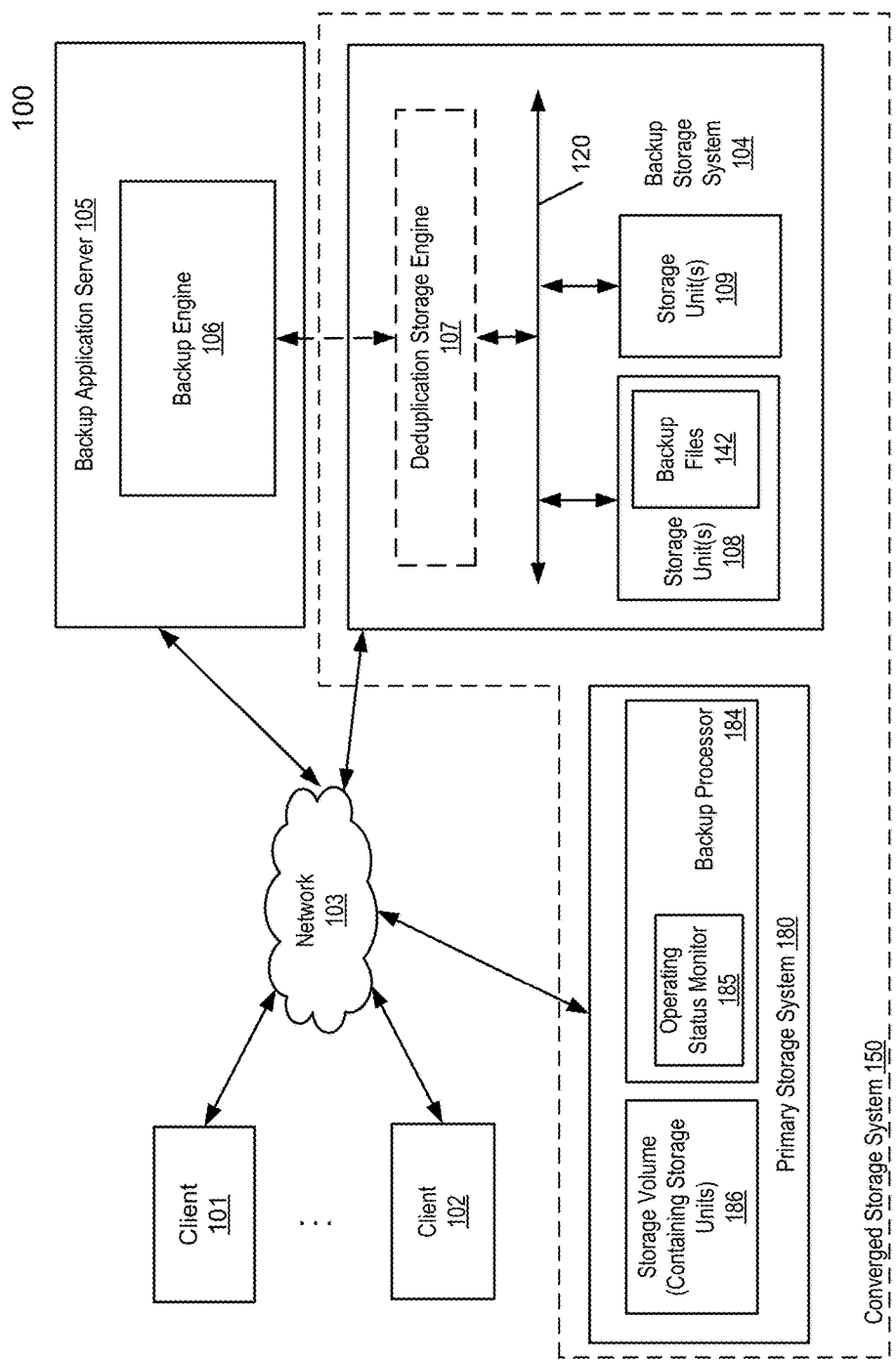
FIG. 1 is a block diagram illustrating a system for backup according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

According to some embodiments, a host is a computing device that is communicatively coupled with a primary storage. Both the host and the primary storage may be communicatively coupled with a backup application server and a secondary storage over a network (e.g., the Internet, a storage network), where the backup application server coordinates backup from the primary storage to the secondary storage. Backup is a process of copying data blocks from one storage system to another storage system. A backup may be a full backup that copies all data blocks from one storage system to another system or an incremental backup that copies only changed portion of the data blocks. Backup may be initiated by the host, the primary storage, the backup application server, or the secondary storage. The backup application server may send a request for a backup of some data blocks to the primary storage. The primary storage then establishes a consistent state of the data blocks (consistent state may also be called point-in-time value, and the two terms are used interchangeably in this specification). In one embodiment, this involves capturing a snapshot of the data blocks to create a snapshot volume. For an incremental backup, the primary storage then identifies the data blocks that have been changed since a previous backup. When a block has changed since the previous backup, it is referred to as a "changed," "modified" or "dirty" block (these terms are used interchangeably in this specification), and needs to be backed up to the secondary storage; other unchanged blocks are referred as "normal" blocks. For a full backup, all the data blocks are considered changed. The blocks from the snapshot volume that are changed are transferred to the secondary storage over the network.

According to some embodiments, a computer-implemented method can be utilized to enhance data protection as discussed herein above. The method starts with monitoring an operating status of a storage volume at a primary storage of a storage system, where the storage volume is allocated to one or more applications. The method continues with determining whether the operating status of the storage volume satisfies a predetermined condition and notifying a backup application to trigger a backup of the storage volume of the primary storage to a backup storage upon determining that the operating status of the storage volume satisfies the first predetermined condition.

According to some embodiments, a storage system can be implemented to enhance data protection. The storage system contains a storage volume configured to contain blocks of data, where blocks of data are utilized by one or more applications. The backup processor includes an operating status monitor, which is configured to monitor an operating status of the storage volume, determine whether the operating status of the storage volume satisfies a predetermined condition, and notify a backup application to trigger a backup of the storage volume of the primary storage to a backup storage upon determining that the operating status of the storage volume satisfies the predetermined condition.

According to some embodiment, a non-transitory computer-readable medium can be implemented to enhance data protection. The non-transitory computer-readable medium has instructions stored therein, which when executed by a processor, cause the processor to perform operations, the operations includes monitoring an operating status of a storage volume at a primary storage of a storage system, wherein the storage volume is allocated to one or more applications, determining whether the operating status of the storage volume satisfies a first predetermined condition, and notifying a backup application to trigger a backup of the storage volume of the primary storage to a backup storage upon determining that the operating status of the storage volume satisfies the first predetermined condition.

FIG. 1 is a block diagram illustrating a system for backup according to one embodiment of the invention. Referring to FIG. 1, system 100 includes, but is not limited to, one or more hosts 101-102 communicatively coupled to primary storage system 180 and secondary storage system 104 over network 103. A primary storage system is sometimes referred to as a primary storage array. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both primary and secondary storage systems 180 and 104 may include any type of server or cluster of servers. For example, they may be storage servers used for any of various different purposes, such as to provide multiple users with access to shared data and/or to back up mission critical data. They may be, for example, a file server (e.g., an appliance used to provide network attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. Both primary and secondary storage systems 180 and 104 may have a distributed architecture, or all of their components may be integrated into a single unit. Both primary and secondary storage systems 180 and 104 may be implemented as part of an archive and/or backup storage system such as a de-duplication storage system available from EMC® Corporation of Hopkinton, Mass.

In one embodiment, backup application server 105 includes, but not limited to, a backup engine 106. Backup application server 105 coordinates with backup storage system 104, primary storage system 180, and hosts 101-102 to run various backup operations. Backup engine 106 may perform both backup and restore functions. In one embodiment, backup application server 105 coordinates backup and restoration operations between hosts 101/102 and primary storage 180, where the data from hosts 101/102 are backed up to and restored from storage volume 182. In another embodiment, backup application server 105 coordinates backup and restoration operations between primary storage 180 and secondary storage 104, where the data from storage volume 186 of primary storage 180 are backed up to storage units 108-109 at secondary storage 104 (sometimes primary storage 180 and secondary storage 104 are referred to as cascaded storages). Note while backup application server 105 is illustrated as a standalone apparatus in FIG. 1, in some embodiments, backup application server 105 is a module embedded within primary storage 180 or secondary storage 104. In addition, both primary storage system 180 and secondary storage 104 may be included in a single storage system, which is often referred to as a converged storage system 150. The converged storage system 150 may also include backup application server 105 in some embodiments. Embodiments of the invention apply to both a converged storage system and a distributed storage system includes one or more separate primary storage system, secondary storage system, and backup application server.

Both primary storage system 180 and secondary storage system 104 may perform deduplication. The deduplication processes performed and storage units allocated are similar between primary storage system 180 and secondary storage system 104, thus only the processes and storage units within one of them are disclosed below for illustration. In one embodiment, secondary storage system 104 may include, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID). Backup files 142 represent data stored in storage units 108.

In response to a data file to be stored in storage units 108-109, optional deduplication storage engine 107 is configured to segment the data blocks into multiple segments (also referred to as data chunks or simply chunks) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata may be stored in at least some of storage units 108-109, such that files can be accessed independent of another storage unit. Metadata of each storage unit includes enough information to provide access to the files it contains.

In one embodiment, the primary system and secondary storage system as shown in FIG. 1 each may be used as a tier of storage in a storage hierarchy that comprises other tiers of storage. One or more tiers of storage in this hierarchy may utilize different kinds of storage devices and/or may be optimized for different characteristics such as random update performance. Data are periodically moved among the tiers based on data protection policies to achieve a cost-effective match to the current storage requirements of the data. For example, data may initially be stored in a tier of storage that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage, and different purpose (e.g., replication, or backup) for a tiered data storage system.

Referring to FIG. 1, backup engine 106 is configured to back up data from hosts 101-102 and to store the backed up data in one or more of storage units 108 of backup storage system 104, where the data may be deduplicated by deduplication storage engine 107. For example, a user (e.g., an administrator) initiates a backup request, directly or through a backup schedule, to primary storage system 180. Note in some embodiments, the user may request a full backup or an incremental backup, and backup processor 184 of primary storage system 180 decides whether full storage volume 186 or changed data within storage volume 186 only are transferred (e.g., backup processor 184 may decide to transfer changed data only when the secondary storage has an earlier backup of the data and only changed data are needed to fully reconstruct the data at the secondary storage).

Storage volume 186 represents the data blocks stored in storage units of the primary storage. The data blocks are utilized by one or more applications ran by hosts 101-102. Operating status monitor 185 is configured to monitor the status of storage volume 186 and facilitate data protection of the data in storage volume 186. While operating status monitor 185 is illustrated within backup processor 184 in FIG. 1, operating status monitor 185 may be outside of backup processor 184, e.g., it may be a software module stored in a non-transitory computer-readable medium of primary storage system 180 in some embodiments. For another example, operating status monitor 185 may reside in backup application server 105, particularly when backup application server 105 is a module within a converged storage system.

Figure 2:
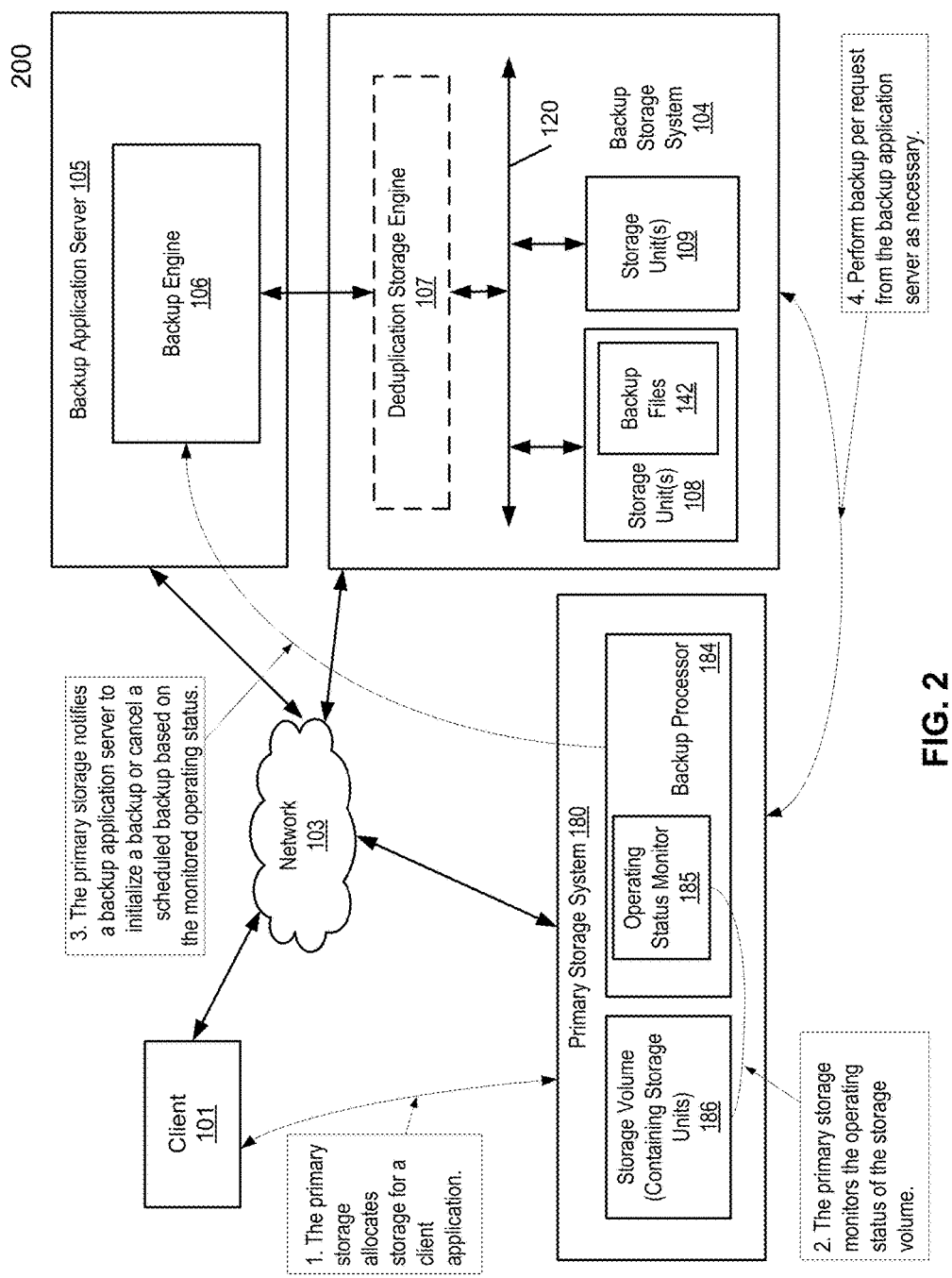
FIG. 2 is a block diagram illustrating a data protection process according to one embodiment of the invention.

FIG. 2 is a block diagram illustrating a data protection process according to one embodiment of the invention. System 200 of FIG. 2 is similar to system 100 of FIG. 1, and the same or similar references indicate elements or components having the same or similar functionalities. Some blocks and connectivities are omitted in FIG. 2 to leave space to discuss the data protection process more clearly. Task boxes 1 to 4 illustrate the order in which operations are performed according to one embodiment of the invention.

At task box 1, primary storage system 180 allocates storage for a client application (e.g., a database application). The client application is for client 101 in this example. In one embodiment, client 101 discovers primary storage system 180 and runs the application on storage volume 186. Of course, multiple applications, for client 101 or other clients, may be ran in storage volume 186 concurrently with the client application.

At task box 2, primary storage system 180 monitors the operating status of storage volume 186. The storage volume status changes as the client application running, and operating status monitor 185 continuously monitor the storage volume status.

At task box 3, primary storage system 180 notifies a backup applications server 105 to initialize a backup if the monitored operating status of the storage volume satisfies a predetermined condition. In addition, the backup application server 105 may request primary storage system 180 for backup of the storage volume (e.g., through a scheduled backup) without knowing the status of primary storage system. If the monitored operating status of the storage volume satisfies a different predetermined condition, primary storage system ignores the backup request thus not performing the requested backup. At task box 4, a backup process is initiated between primary storage system 180 and backup storage system 104 when the backup application server 105 is notified to initialize the backup.

Through the process, the backup between primary storage system 180 and backup storage system 104 is managed based on an operating status of primary storage system 180. In other words, the backup is no longer performed rigidly based on a time interval, rather, the backup is performed when the operating status of the primary storage system indicates the need of backup. The flexible backup makes data protection through backup more efficient.

Figure 3:
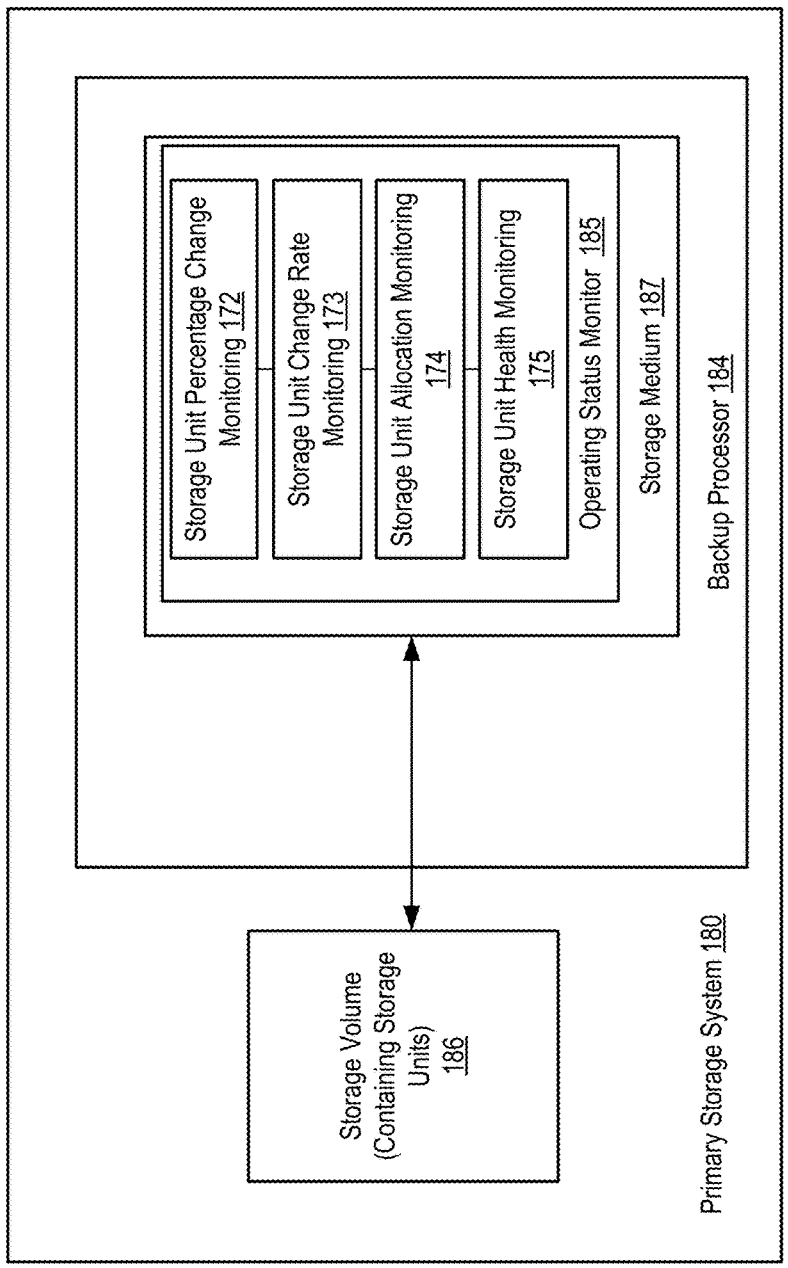
FIG. 3 is a block diagram illustrating modules for monitoring within an operating status monitor according to one embodiment of the invention.

FIG. 3 is a block diagram illustrating modules for monitoring within an operating status monitor according to one embodiment of the invention. Primary storage system 180 of FIG. 3 is similar to primary storage system 180 of FIG. 1, and the same or similar references indicate elements or components having the same or similar functionalities. Operating status monitor 185 is stored in storage medium 187 (e.g., a non-transitory computer-readable medium), and it contains at least one of storage unit percentage change monitoring module 172, storage unit change rate monitoring module 173, storage unit allocation monitoring module 174, and storage unit health monitoring module 175. While FIG. 3 illustrates the four modules all reside within operating status monitor 185 individually, only one or more modules may reside within an operating status monitor in some embodiment. In addition, some or more modules may be integrated into one modules, and the modules, separately or being integrated, may be a part of a larger module performing other functionalities.

Storage unit percentage change monitor module 172 may be configured to monitor the percentage of change of storage volume 186. The percentage of change of storage volume 186 is then compared to a predetermined percentage threshold (e.g., the predetermined percentage threshold is 10% of the storage volume being changed). If the percentage of change of storage volume 186 exceeds the predetermined percentage threshold, storage unit percentage change monitor module 172 triggers a notification, which is then sent to backup application server 105, through which a backup process is coordinated between primary storage system 180 and backup storage system 104.

The predetermined percentage threshold may be a single value stored within storage unit percentage change monitor module 172 or elsewhere in primary storage 180. The predetermined percentage threshold may also be a set of values, and storage unit percentage change monitor module 172 contains the intelligence to determine which of the set of values to use to trigger a backup request.

For example, for some mission critical applications, even a small percentage of change of storage volume within the primary storage may warrant a backup to the secondary storage, and a lower value is selected to trigger the backup request. In other words, storage unit percentage change monitoring may be application-aware, and it may apply different predetermined percentage thresholds for different applications. For another example, for some storage units, due to their locations or priorities, even a small percentage of change within the storage units may warrant a backup to the secondary storage. That is, storage unit percentage change monitoring may be storage-unit-aware, and it may apply different predetermined percentage thresholds for different storage units.

The monitoring of the percentage of change of storage volume 186 may also be used to cancel a requested backup. A backup may be initiated through scheduling a backup request, e.g., by an administrator through a backup application server, a secondary storage system, or the primary storage system itself. Once being notified of the backup request, the storage unit percentage change monitor module 172 then compare the percentage of change of storage volume 186 to another predetermined percentage threshold (e.g., 8% of the storage volume being changed), and if the percentage of change of storage volume 186 is below the predetermined percentage threshold, backup processor 184 ignores the requested backup. When the requested backup is a scheduled backup, the scheduled backup is skipped. Note the predetermined percentage threshold for ignoring a backup request may be the same or different from the predetermined percentage threshold to trigger a notification for a backup.

Storage unit change rate monitoring module 173 may be configured to monitor the change rate of storage units within storage volume 186. The operations for storage unit change rate monitoring module 173 are similar to those for storage unit percentage change monitor module 172, and a set of predetermined change rate threshold values may also be utilized. A storage unit change rate monitoring module may also be application and/or storage-unit-aware. Storage unit change rate monitoring module 173 concerns the change rate instead of the absolute change percentage of storage volume. It is necessary as some application may not change substantial amount of data in the primary storage, but it changes data rapidly. For data protection, it is desirable to keep multiple versions of data for the application, even though the amount of data change itself does not cause the storage unit percentage change monitor module to take action. Similar to storage unit percentage change monitor module 172, storage unit change rate monitoring module 173 may also be used to cancel a requested backup.

Storage unit allocation monitoring module 174 may be configured to monitor changes of storage unit allocation for applications. When the size of storage allocated to an application is to be changed (e.g., receiving a request for changing storage allocation of the application by an application administrator), storage unit allocation monitoring module 174 triggers a notification, which is then sent to backup application server 105, through which a backup process is coordinated between primary storage system 180 and backup storage system 104. The backup triggered by storage unit allocate change keeps a consistent state of the data blocks within data volume, which contains point-in-time copy of the existing configuration, thus the process protects the data prior to the change of storage unit allocation.

Storage unit health monitoring module 175 may be configured to monitor health of the storage units of primary storage 180. When a storage unit fails or its performance is degraded, it is preferable to back up the data blocks on the storage unit, even if a backup is not needed otherwise. Also, some data are stored in redundancy. For example, data may be stored in one or more volumes of Redundant Array of Inexpensive Disks (RAID) as discussed herein above. When a storage unit (e.g., a disk) operates normally but its redundant storage unit is failed or degraded, the redundancy is lost, and it is preferable to protect the data stored in the storage unit through a backup to a secondary storage system. Thus, once storage unit health monitoring module 175 detects a certain condition relating to the health of a storage unit (e.g., degrade or failure of the storage unit) that one or more applications utilize, it triggers a notification, which is then sent to backup application server 105, through which a backup process is coordinated between primary storage system 180 and backup storage system 104.

In one embodiment, the modules may interact and the various thresholds may be adjusted based on the interactions. For example, once storage unit health monitoring module 175 determines that a storage unit is degraded or failed, in addition to trigger a backup, module 175 also triggers an update of the predetermined percentage threshold of the storage unit percentage change monitor module 172, or the intelligence to determine which of the set of values for the predetermined percentage threshold is to be selected, so that a different percentage threshold (likely a lower percentage threshold, given that the storage unit is not operating normally) is used for module 172 in operating status monitor 185 for future backups. Similarly, module 175 may trigger an update of the predetermined change rate threshold or the intelligence to determine which of the set of values for the predetermined change rate threshold is to be selected in storage unit change rate monitoring module 173. For another example, storage unit allocation monitoring module 174 may notify the storage unit percentage change monitor module 172, storage unit change rate monitoring module 173, and/or storage unit health monitoring module 175, which then change their own threshold/condition to trigger a notification for future backup.

Figure 4:
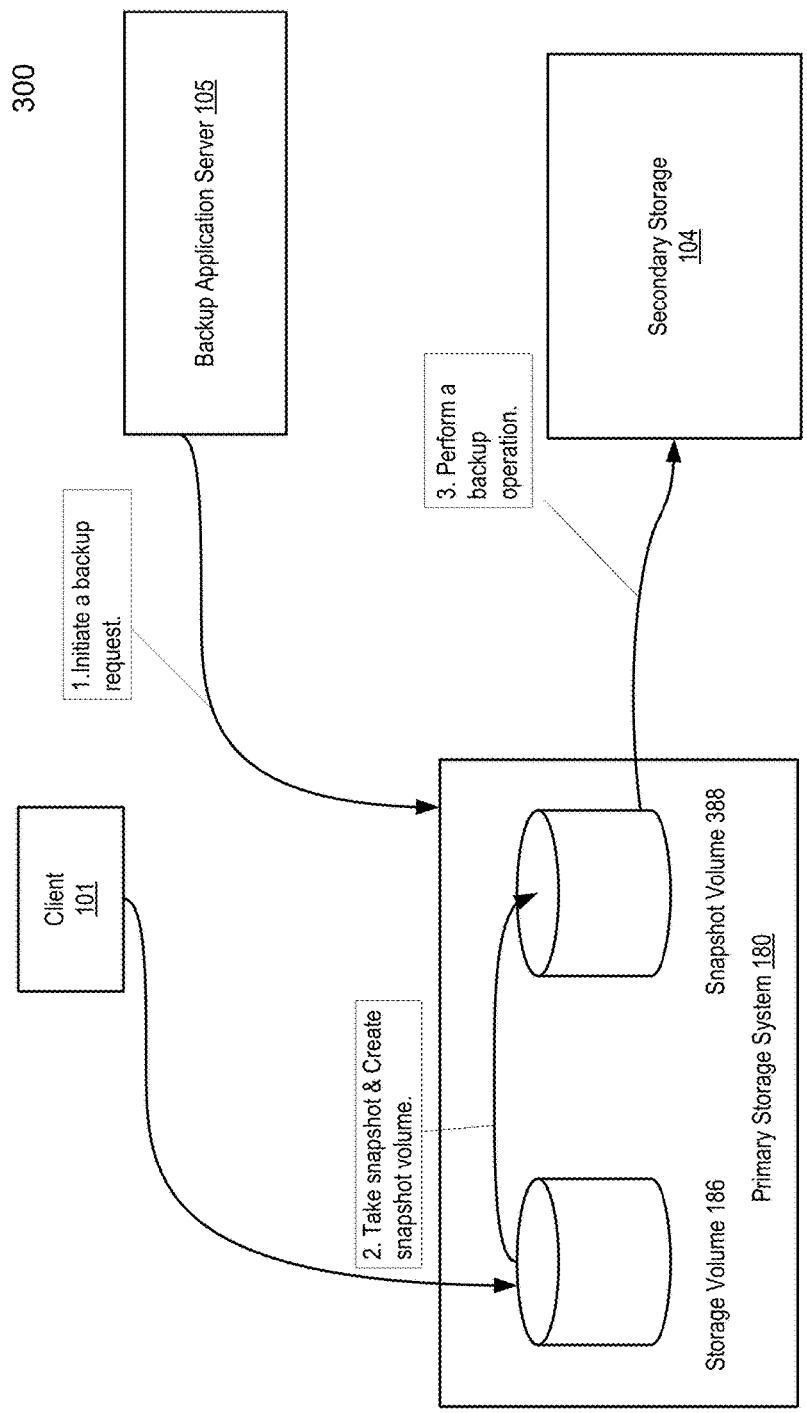
FIG. 4 is a block diagram illustrating a backup process utilizing snapshot volume.

The backup of data from a primary storage system to a secondary storage system may be performed in a variety of ways. FIG. 4 is a block diagram illustrating a backup process utilizing snapshot volume. Task boxes 1 to 3 illustrate the order in which operations are performed according to one embodiment of the invention. System 300 is similar to system 100 in FIG. 1 and the same or similar references indicate elements or components having the same or similar functionalities. The connectivity between various entities and modules within entities are omitted in FIG. 4 to leave space to discuss the backup process more clearly.

After receiving a notification sent by primary storage system 180 requesting for a backup as discussed herein above, the process starts at backup application server 305 with a request for a backup of client 101 at task box 1. The backup request may be for an incremental backup in some embodiment, and the backup request may be for a full backup in another embodiment. Primary storage 180 receives the request. After receiving the request, primary storage 380 decides to initiate an incremental or a full backup. Primary storage 180 may decide to initiate an incremental backup even if the backup request does not explicitly requests so for transfer efficiency purposes. At task box 2, a snapshot is captured (e.g., through backup processor 184) to establish a consistent state of storage volume 186 within primary storage 180. The resulting snapshot is saved at snapshot volume 388.

At task box 3, backup operation is performed. In one embodiment, changed blocks within the snapshot volume 388 are identified and then transferred. The identification of changed blocks may happen prior to or concurrently with a backup request being received at primary storage 380. The identification of changed block may be achieved through a variety of ways. For example, a variety of data structures such as a bit vector or a table (e.g., hash table, tree, or array) may be used to track dirty blocks within primary storage system 180.

Figure 5:
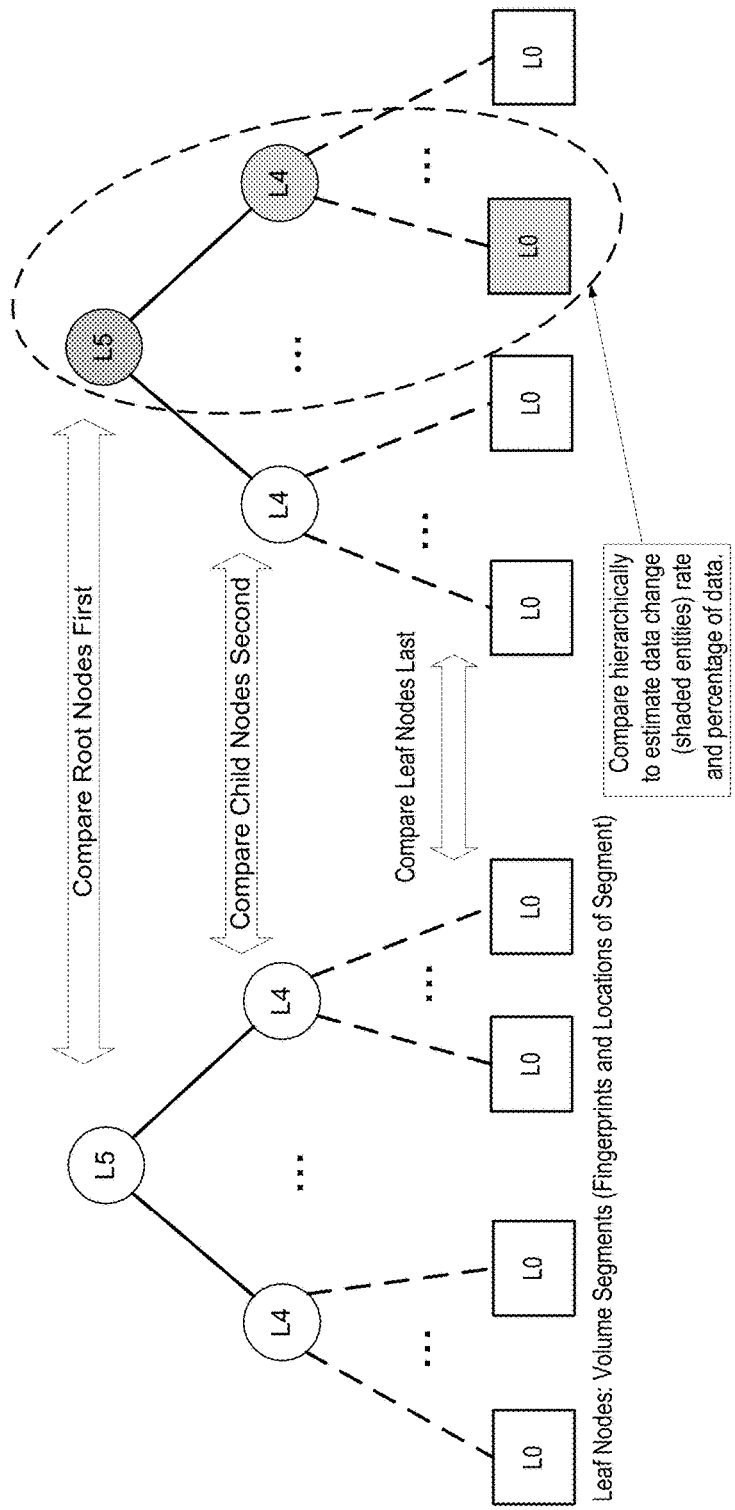
FIG. 5 illustrates a process to estimate the percentage of change of the storage volume and the change rate of the storage value utilizing a temporary snapshot.

Snapshot process may also be utilized to determine the percentage of change of the storage volume and the change rate of the storage value. FIG. 5 illustrates a process to estimate the percentage of change of the storage volume and the change rate of the storage value utilizing a temporary snapshot. In a deduplication storage system (such as primary storage system 180 and secondary storage system 104), each file corresponds to a segment tree. The segment tree in a deduplication storage system is often referred to as an LP segment tree, where the "L" in LP refers to level, and P is the number of levels within the segment tree. The LP segment tree is a Merkle tree representing a file. In this example the LP segment tree has six levels. The bottom level, level zero (L0), contains file data, which may be content-defined fingerprint (e.g., SHA-1 hash) of an associated file segment (e.g., a chunk). The nodes of parent levels contains fingerprints of the child nodes (e.g., the immediate child node), using them to refer a child using a fingerprint of the child segment. In order to locate the data for a specific offset in a file, one may traverse the Merkle tree based on the node size covered to the leaf node for that offset.

In some system, one may have a segment tree for the storage volume of a primary storage, instead of only for a file. For example, an exported storage volume may be represented by a file in the underlying storage system. In that case, a storage volume and a file are interchangeable. In this kind of system, a snapshot is a point-in-time copy of the segment tree for the storage volume. If the backup does not create snapshot volume, but just take a snapshot of the segment tree (referred to as a "temporary snapshot" of the storage volume), it will be faster and less resource consuming. The temporary snapshot of the segment tree 504 will then be compared to a previous backup snapshot of the segment tree 502.

In order to quickly compare the two snapshots, backup processor 184 may do a comparison of the two segment trees starting at the root node. If the fingerprints at any two pairs of nodes (a pair means node A in segment tree 502 compared to node A in segment tree 504) differs, then changes have occurred in the subtree covered by that parent node. Eventually, using this procedure, backup processor 184 may identify the leaves that are different, and by counting them backup processor may estimate the amount of data that has changed and the approximate change rate in the storage volume.

Figure 6:
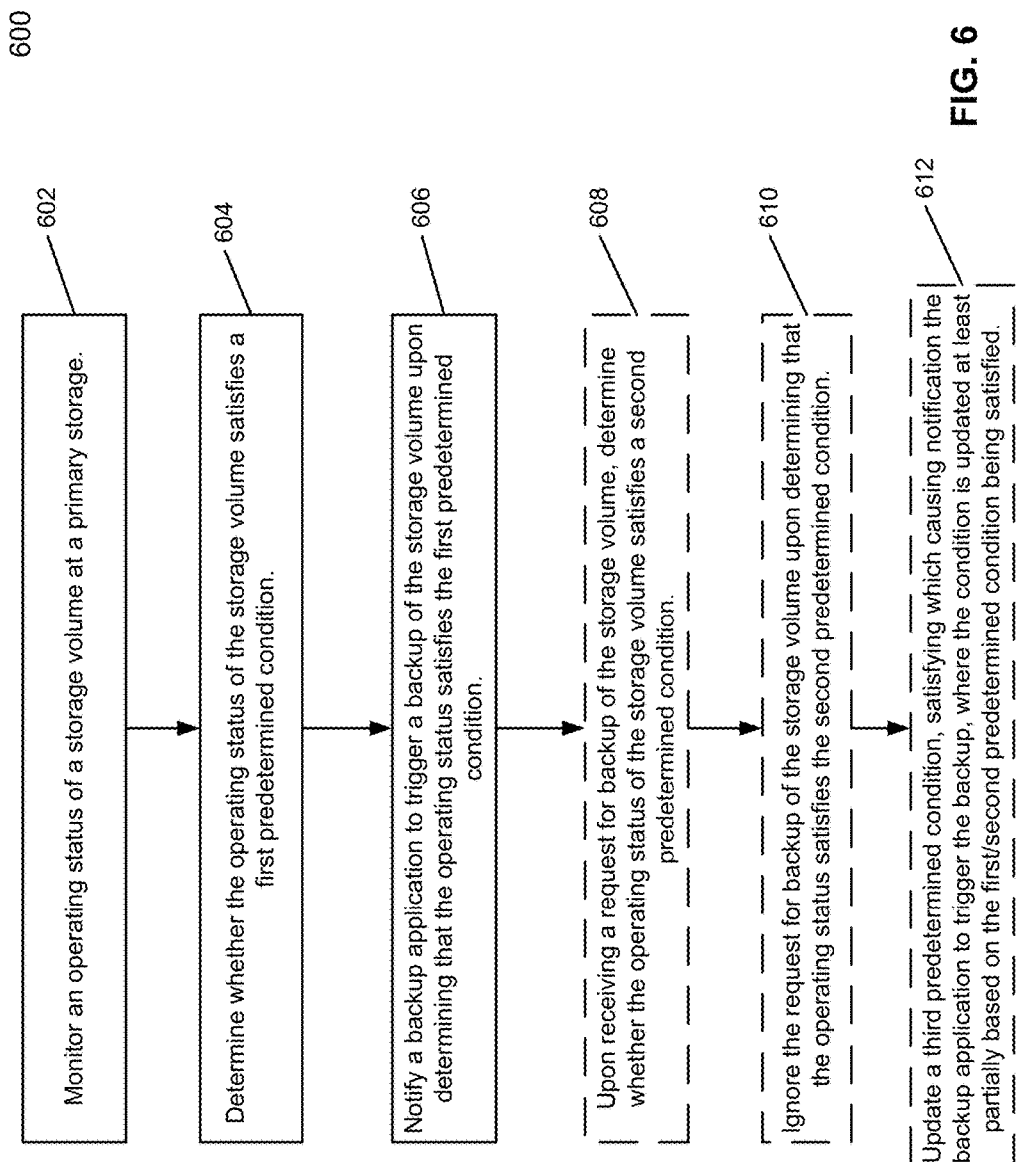
FIG. 6 a flow diagram illustrating a data protection process based on storage status according to one embodiment of the invention.

FIG. 6 a flow diagram illustrating a data protection process based on storage status according to one embodiment of the invention. Method 600 may be implemented in primary storage system 180 (including converged storage system 150), particularly operating status monitor 185.

Method 600 starts with an operating status monitor monitoring an operating status of the primary storage system at reference 602. The monitoring may be continuous in the backup of operation of the primary storage system, and it may also be triggered by an administrator of the primary storage system after the primary storage system is in operation.

At reference 604, the operating status monitor determines whether the operating status of the storage volume satisfies a predetermined condition (referred to as the first predetermined condition to differentiate another predetermined condition discussed in relating to references 608-610). The predetermined condition may be one or more of condition such as a percentage of change of the storage volume exceeds a first predetermined percentage, a change rate of the storage volume exceeds a first predetermined change rate, a size of storage units allocated in the storage volume for one application is to be changed, and a storage unit allocated for the application is in a failure or degraded state. Note the percentage of change and change rate of the storage volume may be estimated through comparing a temporary snapshot of the storage volume to a previous snapshot of the storage volume as discussed herein above.

At reference 606, the operating status monitor notifies a backup application to trigger a backup of the storage volume upon determining that the operating status satisfies the first predetermined condition. The backup application may be implemented within a standalone backup application server as illustrated in FIG. 1, but it may also implemented as a part of the primary storage system.

Optionally at reference 608, upon receiving a request for backup of the storage volume, the operating status monitor determines whether the operating status of the storage volume satisfies another predetermined condition (referred to as the second predetermined condition). The second predetermined condition may be one or more of condition such as a percentage of change of the storage volume is below a second predetermined percentage, and a change rate of the storage volume is below a second predetermined change rate.

Then optionally at reference 610, the operating status monitor causes the primary storage to ignore the request for backup of the storage volume upon determining that the status of the storage volume satisfies the second predetermined condition.

Note that operations at references 608-610 are optional operations in method 600. However, in some embodiments of the invention, a method may be implemented performing only operations in references 602, 608, and 610. That is, the embodiment of invention may be utilized to reduce the number of backup required. So, by suppressing a backup, embodiments of the invention allow the system to retain more "data changes" rather than just number of backups. Such suppression is particularly beneficial when a retention policy states that only X number of backups are kept. For example, in that case of a rigid schedule based backup, a system might take a new backup in a situation where no data has changed. This counts against a backup where much data has changed. Thus the storage status based backup scheme allows for better change-level retention.

In addition, optionally at reference 612, the operating status monitor updates a third predetermined condition. The third predetermined condition may also be one of the conditions monitored by storage unit percentage change monitor module 172, storage unit change rate monitoring module 173, storage unit allocation monitoring module 174, and storage unit health monitoring module 175. Satisfying the third predetermined condition also causes the operating status monitor to notify the backup application to trigger a backup of the storage volume. The third predetermined condition is updated at least partially based on the first or the second predetermined condition being satisfied. For example, the predetermined percentage threshold or the predetermined change rate threshold may be updated as discussed herein above.

Figure 7:
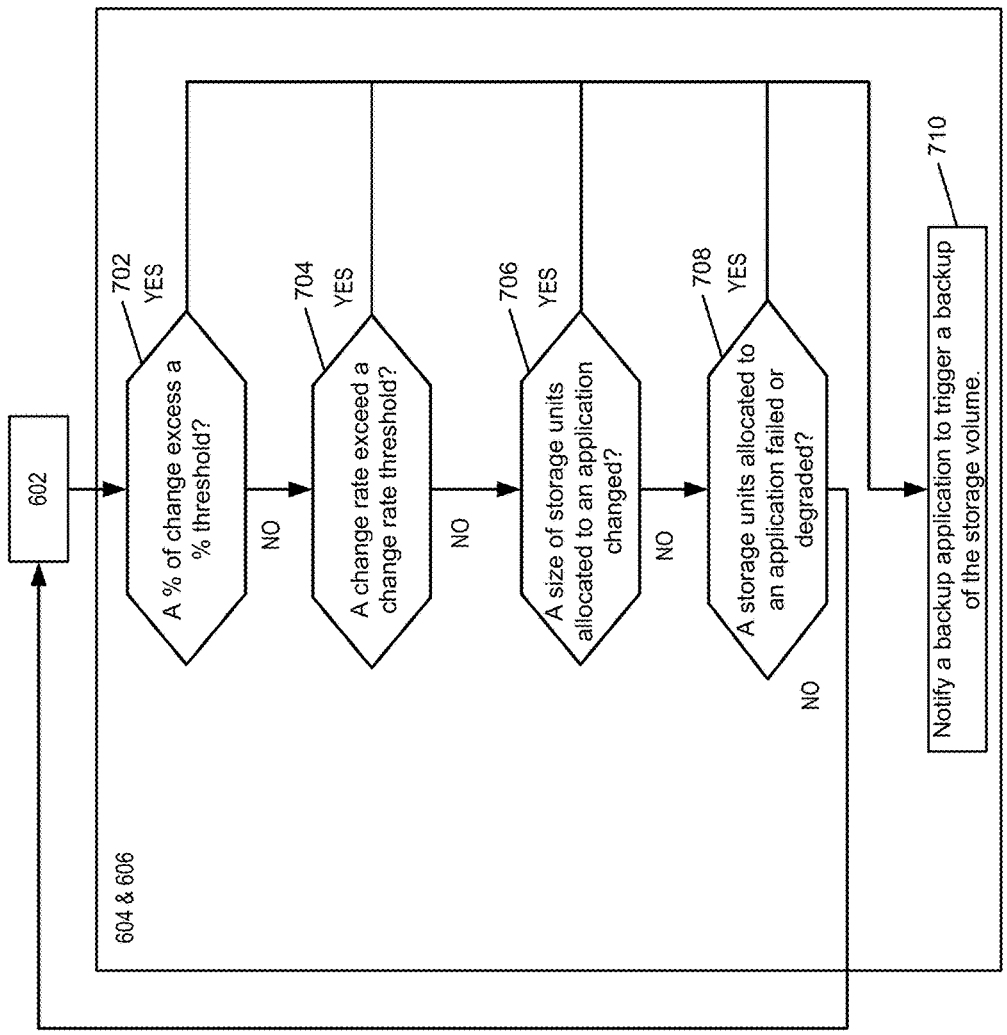
FIG. 7 illustrates the details of the operating status monitor determining whether the operating status of the storage volume satisfies a predetermined condition according to one embodiment of the invention.

FIG. 7 illustrates the details of the operating status monitor determining whether the operating status of the storage volume satisfies a predetermined condition according to one embodiment of the invention. Method 700 contains references 602-606, and it is an implementation of operations discussed in relating to references 602-606. References 702-710 include the operations within references 604 and 606 discussed herein above.

At reference 702, the operating status monitor determines whether a percentage of change of the storage volume exceeds a predetermined percentage. If the percentage of change exceeds the predetermined percentage, the flow goes to reference 710, and a notification to a backup application to trigger a backup of the storage volume. Otherwise the flow goes to reference 704.

At reference 704, the operating status monitor determines whether a change rate of the storage volume exceeds a predetermined change rate. If the change rate exceeds the predetermined change rate, the flow goes to reference 710 again. Otherwise the flow goes to reference 706.

At reference 706, the operating status monitor determines whether a size of storage units allocated in the storage volume for an application is to be changed. The storage unit allocation change may be requested by an administrator of the primary storage system or a client of the primary storage system. If the size of storage units allocated for the application is to be changed, the flow goes to reference 710.

At reference 708, the operating status monitor determines whether a storage unit allocated for the application is in a failure or degraded state. The storage unit allocated for the application may be for redundancy purpose and not the storage unit involves in active operations of the application. If the storage unit allocated for the application is in a failure or degraded state, the flow goes to reference 710. Otherwise the flow goes back to reference 602, and the operating status monitor continues monitoring the operating state.

Note the order of references 702-708 is implementation dependent and an embodiment of the invention may implement the operations differently from illustrated in FIG. 7. In addition, an embodiment of the invention may implement only one or several of the operations relating to reference 702-708, or an embodiment of the invention may implement other determination operations to cause the operating status monitor to send a notification to a backup application to trigger a backup of the storage volume.

Figure 8:
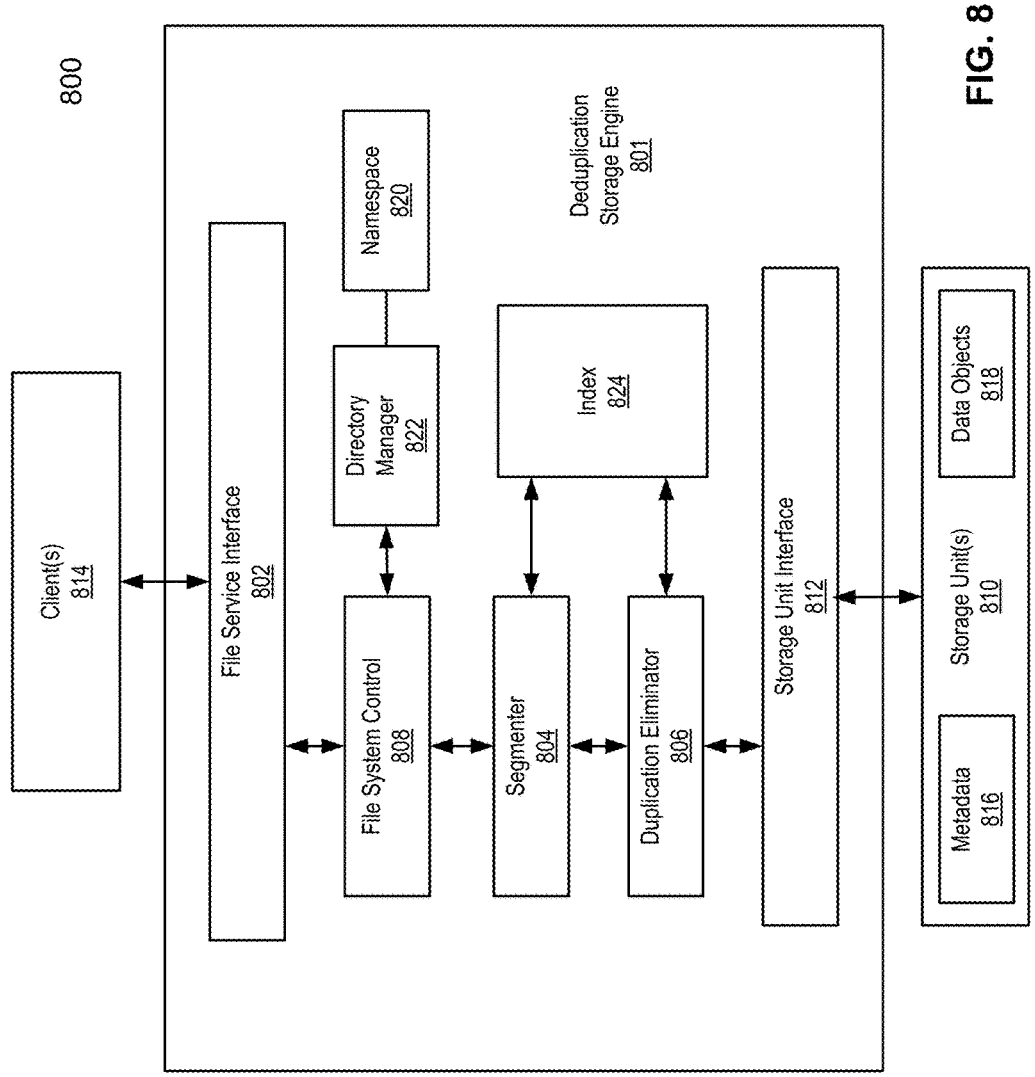
FIG. 8 is a block diagram illustrating a deduplication storage system according to one embodiment of the invention.

As discussed herein above, data backup/transfer may be integrated with deduplication and both primary storage 180 and secondary storage 104 implementing embodiments of the invention may be deduplication storage systems. FIG. 8 is a block diagram illustrating a deduplication storage system according to one embodiment of the invention. For example, deduplication storage system 800 may be implemented as part of a deduplication storage system as described above, such as, for example, the deduplication storage system as a client and/or a server as shown in FIG. 1. In one embodiment, storage system 800 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 800 may have a distributed architecture, or all of its components may be integrated into a single unit. Storage system 800 may be implemented as part of an archive and/or backup system such as a deduplication storage system available from EMC® Corporation of Hopkinton, Mass.

In one embodiment, storage system 800 includes a deduplication engine 801 interfacing one or more clients 814 with one or more storage units 810 storing metadata 816 and data objects 818. Clients 814 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 810 may be implemented locally (e.g., single node operating environment) or remotely (e.g., multi-node operating environment) via an interconnect, which may be a bus and/or a network (e.g., a storage network). In one embodiment, one of storage units 810 operates as an active storage to receive and store external or fresh user data from a client (e.g., an end-user client or a primary storage system associated with one or more end-user clients), while the another one of storage units 810 operates as a target storage unit to periodically archive data from the active storage unit according to an archiving policy or scheme. Storage units 810 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 810 may also be combinations of such devices. In the case of disk storage media, the storage units 810 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 816, may be stored in at least some of storage units 810, such that files can be accessed independent of another storage unit. Metadata of each storage unit includes enough information to provide access to the files it contains. In one embodiment, metadata may include fingerprints contained within data objects 818, where a data object may represent a data chunk, a compression region (CR) of one or more data chunks, or a container of one or more CRs. Fingerprints are mapped to a particular data object via metadata 816, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 816 may include a file name, a storage unit identifier (ID) identifying a storage unit in which the chunks associated with the file name are stored, reconstruction information for the file using the chunks, and any other appropriate metadata information. Metadata 816 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 801 includes file service interface 802, segmenter 804, duplicate eliminator 806, file system control 808, and storage unit interface 812. Deduplication storage engine 801 receives a file or files (or data item(s)) via file service interface 802, which may be part of a file system namespace 820 of a file system associated with the deduplication storage engine 801. The file system namespace 820 refers to the way files are identified and organized in the system. An example is to organize the files hierarchically into directories or folders, which may be managed by directory manager 822. File service interface 812 supports a variety of protocols, including a network file system (NFS), a common Internet file system (CIFS), and a virtual tape library interface (VTL), etc.

The file(s) is/are processed by segmenter 804 and file system control 808. Segmenter 804, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content-based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system control 808, also referred to as a file system manager, processes information to indicate the chunk(s) association with a file. In some embodiments, a list of fingerprints is used to indicate chunk(s) associated with a file. File system control 808 passes chunk association information (e.g., representative data such as a fingerprint) to index 824. Index 824 is used to locate stored chunks in storage units 810 via storage unit interface 812. Duplicate eliminator 806, also referred to as a segment store, identifies whether a newly received chunk has already been stored in storage units 810. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 810 that make up the file. Chunks are then packed by a container manager (which may be implemented as part of storage unit interface 812) into one or more storage containers stored in storage units 810. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 802 is configured to communicate with file system control 808 to identify appropriate chunks stored in storage units 810 via storage unit interface 812. Storage unit interface 812 may be implemented as part of a container manager. File system control 808 communicates (e.g., via segmenter 804) with index 824 to locate appropriate chunks stored in storage units via storage unit interface 812. Appropriate chunks are retrieved from the associated containers via the container manager and are used to construct the requested file. The file is provided via interface 802 in response to the request. In one embodiment, file system control 808 utilizes a tree (e.g., a chunk tree obtained from namespace 820) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 801 may be implemented in software (e.g., executable code executed in a memory by a processor), hardware (e.g., processor(s)), or a combination thereof. For example, deduplication engine 801 may be implemented in a form of executable instructions that can be stored in a machine-readable storage medium, where the instructions can be executed in a memory by a processor.

In one embodiment, storage system 800 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data protection policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
monitoring an operating status of a storage volume at a primary storage of a storage system, including monitoring a health of the primary storage, wherein the storage volume is allocated to one or more applications;
determining whether the operating status of the storage volume satisfies a first predetermined condition, including determining whether a change rate of the storage volume exceeds a first predetermined change rate of the storage volume, wherein the first predetermined condition is satisfied when the change rate of the storage volume exceeds the first predetermined change rate of the storage volume, wherein the change rate of the storage volume is estimated through comparing a temporary snapshot of a segment tree of the storage volume to a previous snapshot of the segment tree of the storage volume, and wherein the comparison starts at a root node of the segment tree, and when necessary, proceeds to leaf nodes of the segment tree; and notifying a backup application to trigger a backup of the storage volume of the primary storage to a backup storage upon determining that the operating status of the storage volume satisfies the first predetermined condition.

2. The computer-implemented method of claim 1, wherein determining whether the operating status of the storage volume satisfies the first predetermined condition, further includes determining whether a percentage of change of the storage volume exceeds a first predetermined percentage of change of the storage volume, wherein the first predetermined condition further is satisfied when the percentage of change of the storage volume exceeds the first predetermined percentage of change of the storage volume.

3. The computer-implemented method of claim 2, wherein the percentage of change of the storage volume is estimated through comparing the temporary snapshot of the segment tree of the storage volume to the previous snapshot of the segment tree of the storage volume.

4. The computer-implemented method of claim 1, wherein the first predetermined condition is further satisfied if a change of the primary storage occurs, and wherein the change includes at least one of:

a size of storage units allocated in the storage volume for one application is to be changed; and a storage unit allocated for the application is in a failure or degraded state.

5. The computer-implemented method of claim 1, further comprising:

upon receiving a request for backup of the storage volume from the backup application, determining whether the operating status of the storage volume satisfies a second predetermined condition; and causing the primary storage to ignore a notification for backup of the storage volume upon determining that the operating status of the storage volume satisfies the second predetermined condition.

6. The computer-implemented method of claim 5, wherein the second predetermined condition includes at least one of:

a percentage of change of the storage volume below a second predetermined percentage; and the change rate of the storage volume below a second predetermined change rate.

7. The computer-implemented method of claim 1, wherein the storage system is a converged storage system containing both the primary storage and the backup storage.

8. The computer-implemented method of claim 1, further comprising:

updating a third predetermined condition, satisfying which also causing a notification of the backup application to trigger a backup of the storage volume, wherein the third predetermined condition is updated at least partially on the operating status of the storage volume satisfying the first predetermined condition.

9. A storage system, comprising:

a storage volume of a primary storage configured to contain blocks of data, wherein the blocks of data are utilized by one or more applications; and a processor implementing an operating status monitor, the operating status monitor configured to monitor an operating status of the storage volume, including monitoring a health of the primary storage, determine whether the operating status of the storage volume satisfies a first predetermined condition, including determining whether a change rate of the storage volume exceeds a first predetermined change rate of the storage volume, wherein the first predetermined condition is satisfied when the change rate of the storage volume exceeds the first predetermined change rate of the storage volume, wherein the change rate of the storage volume is estimated through comparing a temporary snapshot of a segment tree of the storage volume to a previous snapshot of the segment tree of the storage volume, and wherein the comparison starts at a root node of the segment tree, and when necessary, proceeds to leaf nodes of the segment tree, and notify a backup application to trigger a backup of the storage volume of the primary storage to backup storage upon determining that the operating status of the storage volume satisfies the first predetermined condition.

10. The storage system of claim 9, wherein to determine whether the operating status of the storage volume satisfies the first predetermined condition, further includes determining whether a percentage of change of the storage volume exceeds a first predetermined percentage of change of the storage volume, wherein the first predetermined condition further is satisfied when the percentage of change of the storage volume exceeds the first predetermined percentage of change of the storage volume.

11. The storage system of claim 10, wherein the percentage of change of the storage volume is estimated through comparing the temporary snapshot of the segment tree of the storage volume to the previous snapshot of the segment tree of the storage volume.

12. The storage system of claim 9, wherein the first predetermined condition is further satisfied if a change of the primary storage occurs, and wherein the change includes at least one of:

a size of storage units allocated in the storage volume for one application is to be changed; and a storage unit allocated for the application is in a failure or degraded state.

13. The storage system of claim 9, the operating status monitor further configured to:

upon receiving a request for backup of the storage volume from the backup application, determine whether the operating status of the storage volume satisfies a second predetermined condition; and cause the primary storage to ignore a notification for backup of the storage volume upon determining that the operating status of the storage volume satisfies the second predetermined condition.

14. The storage system of claim 13, wherein the second predetermined condition includes at least one of:

a percentage of change of the storage volume below a second predetermined percentage; and the change rate of the storage volume below a second predetermined change rate.

15. The storage system of claim 9, wherein the operating status monitor is further configured to update a third predetermined condition, satisfying which also causing a notification of the backup application to trigger a backup of the storage volume, wherein the third predetermined condition is updated at least partially on the operating status of the storage volume satisfying the first predetermined condition.

16. A non-transitory computer-readable medium having instructions stored therein, which when executed by a processor, cause the processor to perform operations, the operations comprising:
   monitoring an operating status of a storage volume at a primary storage of a storage system, including monitoring a health of the primary storage, wherein the storage volume is allocated to one or more applications;
   determining whether the operating status of the storage volume satisfies a first predetermined condition, including determining whether a change rate of the storage volume exceeds a first predetermined change rate of the storage volume, wherein the first predetermined condition is satisfied when the change rate of the storage volume exceeds the first predetermined change rate of the storage volume, wherein the change rate of the storage volume is estimated through comparing a temporary snapshot of a segment tree of the storage volume to a previous snapshot of the segment tree of the storage volume, and wherein the comparison starts at a root node of the segment tree, and when necessary, proceeds to leaf nodes of the segment tree; and
   notifying a backup application to trigger a backup of the storage volume of the primary storage to a backup storage upon determining that the operating status of the storage volume satisfies the first predetermined condition.

17. The non-transitory computer-readable medium of claim 16, wherein
   determining whether the operating status of the storage volume satisfies the first predetermined condition, further includes determining whether a percentage of change of the storage volume exceeds a first predetermined percentage of change of the storage volume,
   wherein the first predetermined condition further is satisfied when the percentage of change of the storage volume exceeds the first predetermined percentage of change of the storage volume.

18. The non-transitory computer-readable medium of claim 16, wherein the first predetermined condition is further satisfied if a change of the primary storage occurs, and wherein the change includes at least one of:
   a size of storage units allocated in the storage volume for one application is to be changed; and
   a storage unit allocated for the application is in a failure or degraded state.

19. The non-transitory computer-readable medium of claim 16, further comprising:
   upon receiving a request for backup of the storage volume from the backup application, determining whether the operating status of the storage volume satisfies a second predetermined condition; and
   causing the primary storage to ignore a notification for backup of the storage volume upon determining that the operating status of the storage volume satisfies the second predetermined condition.

20. The non-transitory computer-readable medium of claim 19, wherein the second predetermined condition includes at least one of:
   a percentage of change of the storage volume below a second predetermined percentage; and
   the change rate of the storage volume below a second predetermined change rate.

* * * * *